United States Patent
Yang et al.

(10) Patent No.: US 10,356,739 B2
(45) Date of Patent: Jul. 16, 2019

(54) METHOD OF DETECTING SYNCHRONIZATION REFERENCE SIGNAL FROM NEIGHBORING TERMINAL BY TERMINAL TO WHICH V2V TECHNOLOGY IS APPLIED, AND TERMINAL PERFORMING THE SAME

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/674,212

(22) Filed: Aug. 10, 2017

(65) Prior Publication Data
US 2018/0049142 A1    Feb. 15, 2018

Related U.S. Application Data

(60) Provisional application No. 62/374,007, filed on Aug. 12, 2016, provisional application No. 62/416,173, filed on Nov. 2, 2016.

(51) Int. Cl.
*H04J 3/06*     (2006.01)
*H04W 56/00*    (2009.01)
(Continued)

(52) U.S. Cl.
CPC ........... *H04W 56/002* (2013.01); *H04W 4/70* (2018.02); *H04W 76/11* (2018.02);
(Continued)

(58) Field of Classification Search
CPC .. H04W 76/14; H04W 56/002; H04W 40/246
See application file for complete search history.

(56) References Cited

U.S. PATENT DOCUMENTS

2018/0270776 A1*   9/2018   Yasukawa ......... H04W 56/0025

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

* cited by examiner

*Primary Examiner* — Bo Hui A Zhu
(74) *Attorney, Agent, or Firm* — Lee Hong Degerman Kang Waimey

(57) ABSTRACT

One disclosure of the present specification provides a method in which a terminal receives a sidelink synchronization signal (SLSS) from a neighboring terminal. The method includes: determining by the terminal a period and the number of times of transmitting the SLSSs; and transmitting by the terminal the SLSS during a first time duration defined on the basis of the period and the number of times. The transmitting of the SLSS may include detecting by the terminal an SLSS transmitted by the neighboring terminal in a second time duration within the first time duration. The terminal may discard transmission of an SLSS corresponding to the second time duration within the first time duration. The second time duration may be included in the first time duration, and the second time duration is less than or equal to 40% of the first time duration.

9 Claims, 12 Drawing Sheets

(51) Int. Cl.
  *H04W 4/70* (2018.01)
  *H04W 76/11* (2018.01)
  *H04W 40/24* (2009.01)
  *H04W 84/18* (2009.01)
  *H04W 76/14* (2018.01)
(52) U.S. Cl.
  CPC .......... *H04W 40/246* (2013.01); *H04W 76/14* (2018.02); *H04W 84/18* (2013.01)

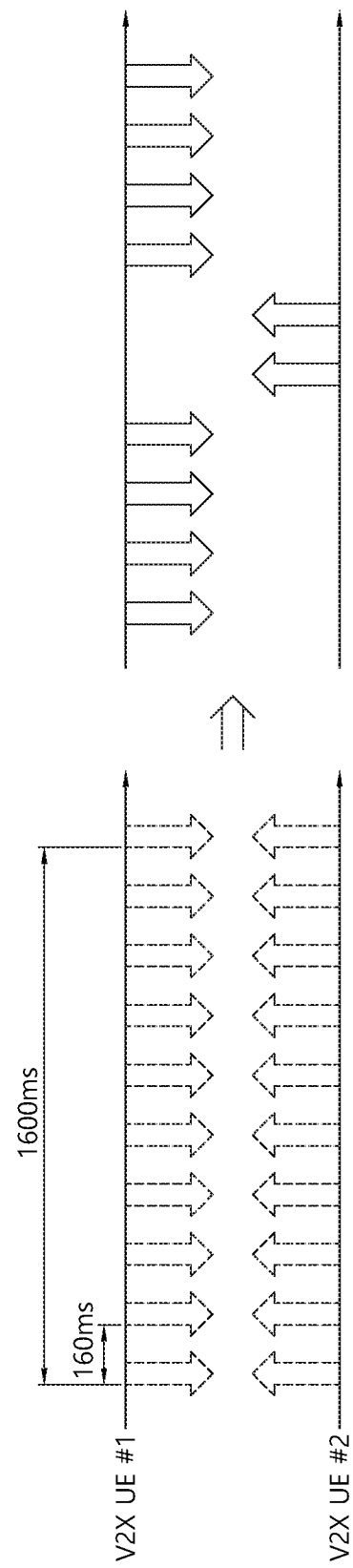

METHOD OF DETECTING SYNCHRONIZATION REFERENCE SIGNAL FROM NEIGHBORING TERMINAL BY TERMINAL TO WHICH V2V TECHNOLOGY IS APPLIED, AND TERMINAL PERFORMING THE SAME

CROSS-REFERENCE TO RELATED APPLICATIONS

Pursuant to 35 U.S.C. § 119(e), this application claims the benefit of U.S. Provisional Patent Application No(s). 62/374,007, filed on Aug. 12, 2016, and 62/416,173, filed on Nov. 2, 2016, the contents of which are all hereby incorporated by reference herein in their entirety.

BACKGROUND OF THE INVENTION

Field of the Invention

The present invention relates to wireless communication, and more particularly, to a method of detecting a synchronization reference signal from a neighboring terminal when a terminal to which a V2V technology is applied is located out of coverage of a base station and thus cannot receive a synchronization signal from the base station.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

There is a need for communication between pieces of UE located at a physically close distance, that is, device to device (D2D) communication, due to an increase of user needs for social network service (SNS).

D2D communication may be performed between pieces of UE located in coverage of a base station or may be performed between pieces of UE located out of coverage of the base station. Furthermore, D2D communication may be performed between UE located out of coverage of a base station and UE located in coverage of the base station.

Contents regarding D2D may be applied to vehicle-to-everything (V2X). V2X generally refers to a communication technology through a vehicle and all of interfaces. An implementation form of V2X may be various, such as vehicle-to-vehicle (V2V), vehicle-to-infrastructure (V2I), vehicle-to-person (V2P), and vehicle-to-network (V2N).

Meanwhile, the aforementioned V2X technology directly uses a sidelink (i.e., D2D communication) technology. However, as a technology for a vehicle or the like, the V2X is applied to a terminal which moves with high speed in comparison with D2D communication. Therefore, there is a problem in that the existing 3GPP standard is not appropriate to an example of implementing V2V communication.

SUMMARY OF THE INVENTION

Accordingly, an object of the present invention is to solve the above-mentioned problems.

In order to achieve the aforementioned purpose, one disclosure of the present specification provides a method in which a terminal receives a sidelink synchronization signal (SLSS) from a neighboring terminal. The method may include: determining by the terminal a period and the number of times of transmitting the SLSSs; and transmitting by the terminal the SLSS during a first time duration defined on the basis of the period and the number of times. The transmitting of the SLSS may include detecting by the terminal an SLSS transmitted by the neighboring terminal in a second time duration within the first time duration. The terminal may discard transmission of an SLSS corresponding to the second time duration within the first time duration. The second time duration may be included in the first time duration, and the second time duration may be less than or equal to 40% of the first time duration.

The second time may be less than or equal to 30% of the first time.

The terminal may discard transmission of two SLSSs among SLSSs to be transmitted during the first time.

The first time may be a least common multiple of a transmission period of the SLSS and a transmission period of a physical sidelink control channel (PSCCH).

The transmission period of the SLSS may be 160 ms. The transmission period of the PSCCH may be 100 ms. The first time may be 800 ms. The second time may be 320 ms.

The first time may be two times the least common multiple of a transmission period of the SLSS and a transmission period of a physical sidelink control channel (PSCCH).

The transmission period of the SLSS may be 160 ms. The transmission period of the PSCCH may be 100 ms. The first time may be 1600 ms. The second time may be 320 ms.

In order to achieve the aforementioned purpose, one disclosure of the present specification provides a terminal for detecting an SLSS of a neighboring terminal. The terminal may include: a radio frequency (RF) unit for receiving the SLSS from the neighboring terminal; and a processor for controlling the RF unit. The processor may be configured for: determining a period and the number of times of transmitting the SLSSs; transmitting the SLSS during a first time duration defined on the basis of the period and the number of times; detecting an SLSS transmitted by the neighboring terminal in a second time duration within the first time duration; and discarding transmission of an SLSS corresponding to the second time duration within the first time duration. The second time duration may be included in the first time duration, and the second time duration is less than or equal to 40% of the first time duration.

According to one disclosure of the present specification, a method of detecting a synchronization reference signal by a terminal to which a V2V technology is applied is proposed, thereby providing an environment of determining a synchronization reference terminal suitable for a terminal which moves with high speed.

BRIEF DESCRIPTION OF THE DRAWINGS

FIG. 10a and FIG. 10b illustrate an SLSS transmission period of a V2V UE and a method of detecting a synchronization reference signal by the V2V UE according to a disclosure of the present specification.

DESCRIPTION OF EXEMPLARY EMBODIMENTS

Figure 1:
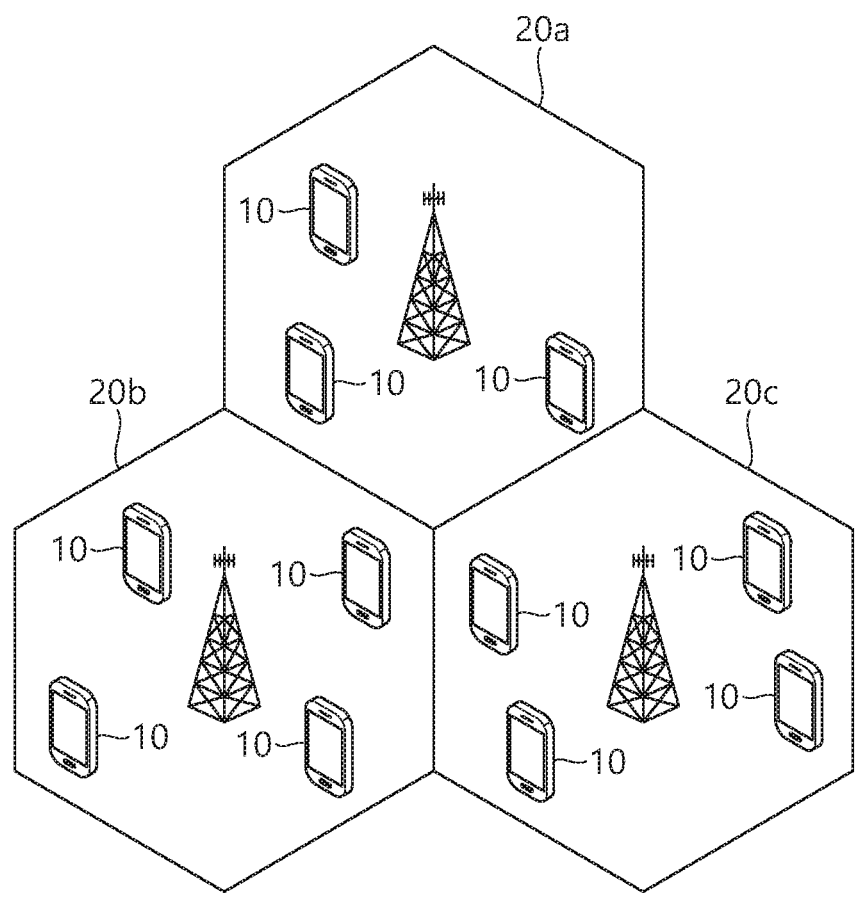
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
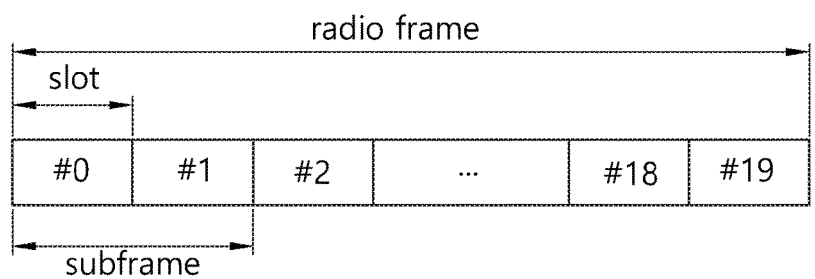
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms. The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
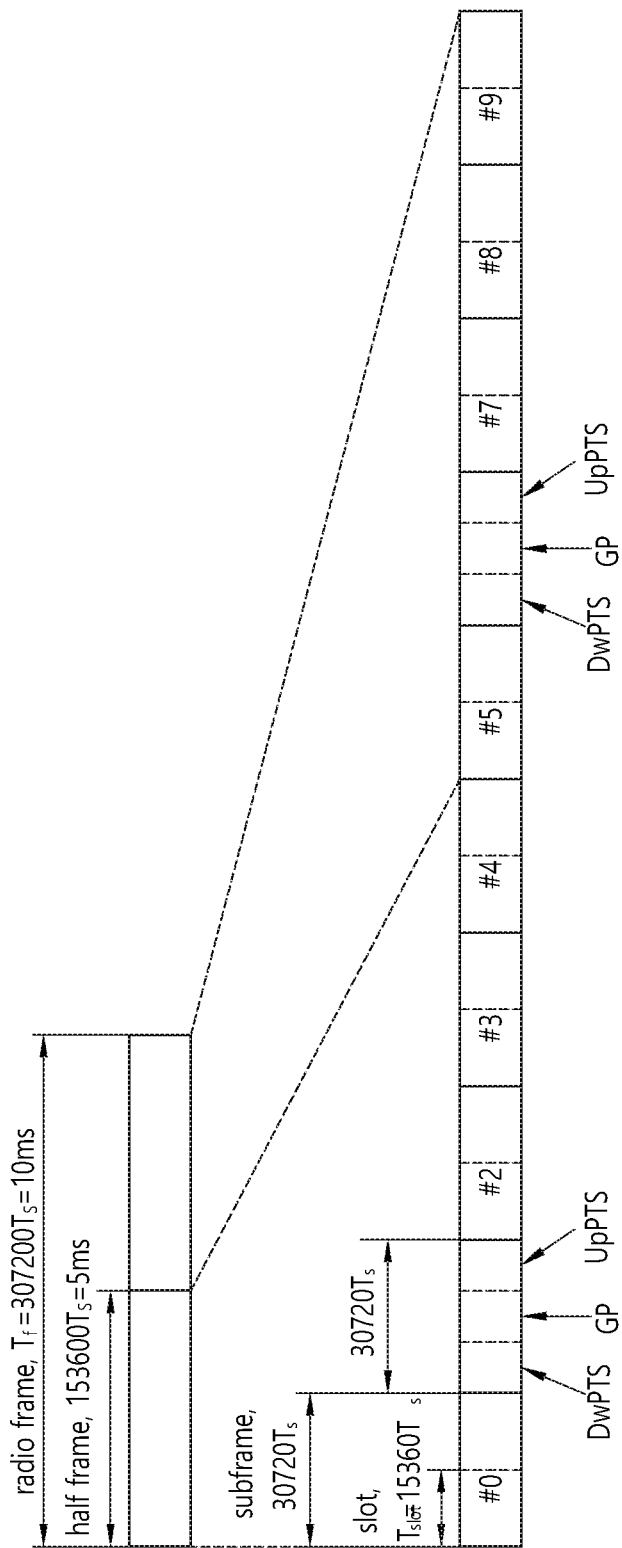
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
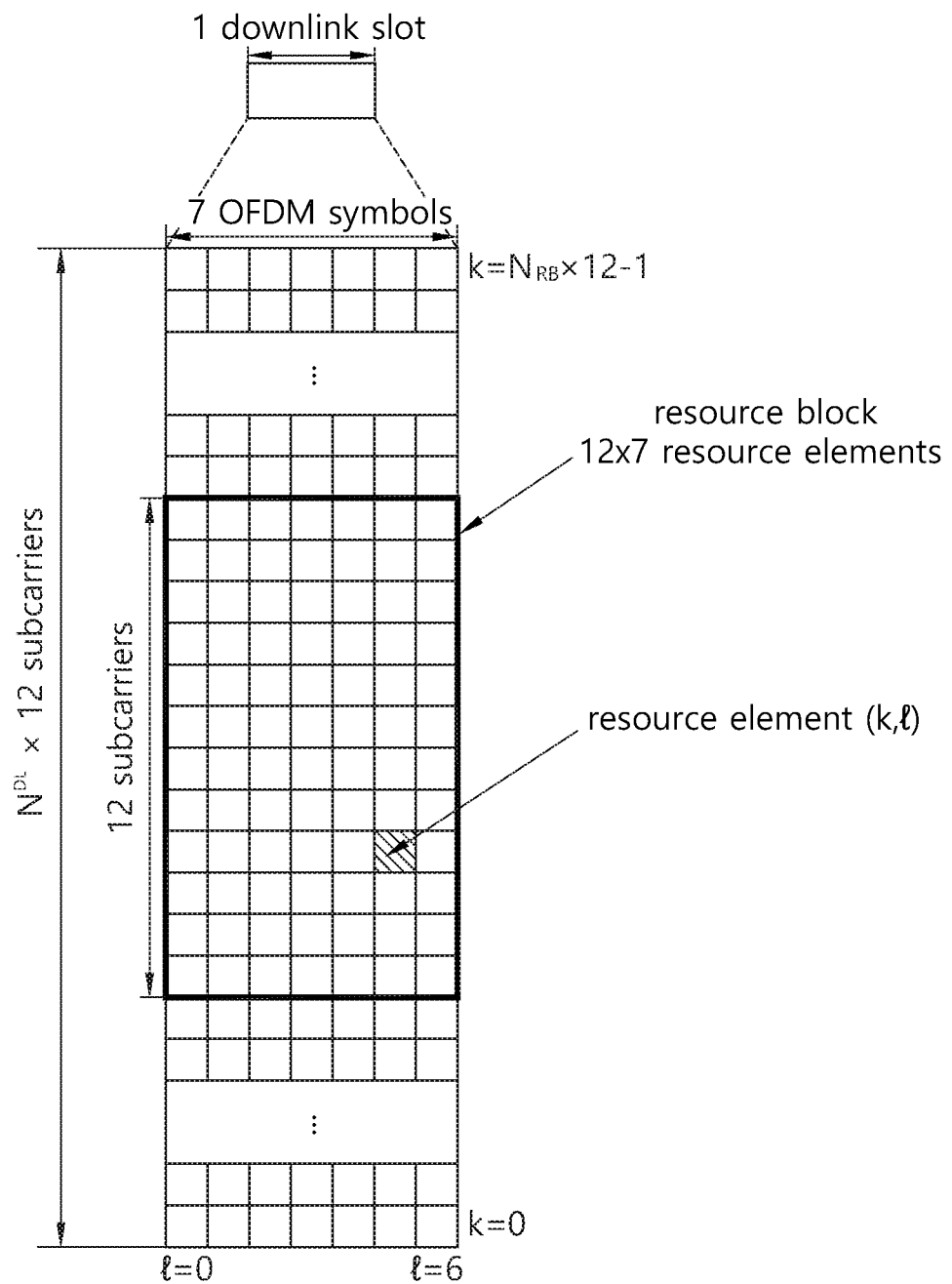
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Downlink Reference Signal>

A RS is described below.

In general, transmission information, for example, data is easily distorted and changed while it is transmitted through a radio channel. Accordingly, a reference signal is required in order to demodulate such a transmission information without an error.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 5:
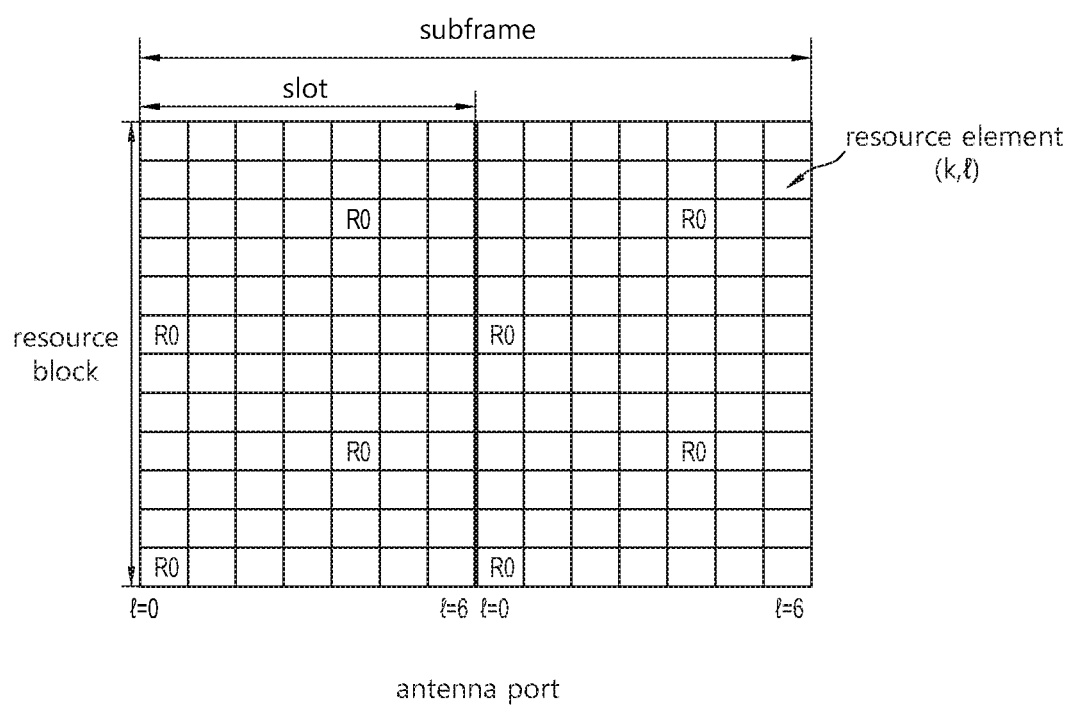
FIG. 5 illustrates an example of a pattern in which a CRS is mapped to an RB when a base station (BS) uses one antenna port.

FIG. 5 illustrates an example of a pattern in which a CRS is mapped to an RB when a BS uses one antenna port.

Referring to FIG. 5, R0 denotes a resource element (RE) to which a CRS transmitted using an antenna port number 0 of a BS is mapped.

The CRS is transmitted in all downlink subframes in a cell which supports PDSCH transmission. The CRS may be transmitted on antenna ports 0 to 3.

A resource element (RE) allocated to a CRS of one antenna port cannot be used in transmission of another antenna port, and must be set to zero. Further, in a multicast-broadcast single frequency network (MBSFN) subframe, the CRS is transmitted only in a non-MBSFN region.

<A Measurement and a Measurement Report>

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is frequently called radio resource management (RRM).

Meanwhile, the UE 100 monitors downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to 10% error of PDCCH transmission by taking into consideration a PCFICH error. The threshold Qin is defined as a level in which downlink may be very significantly reliable compared to the threshold Qout, and corresponds to 2% error of PDCCH transmission by taking into consideration a PCFICH error.

Figure 6:
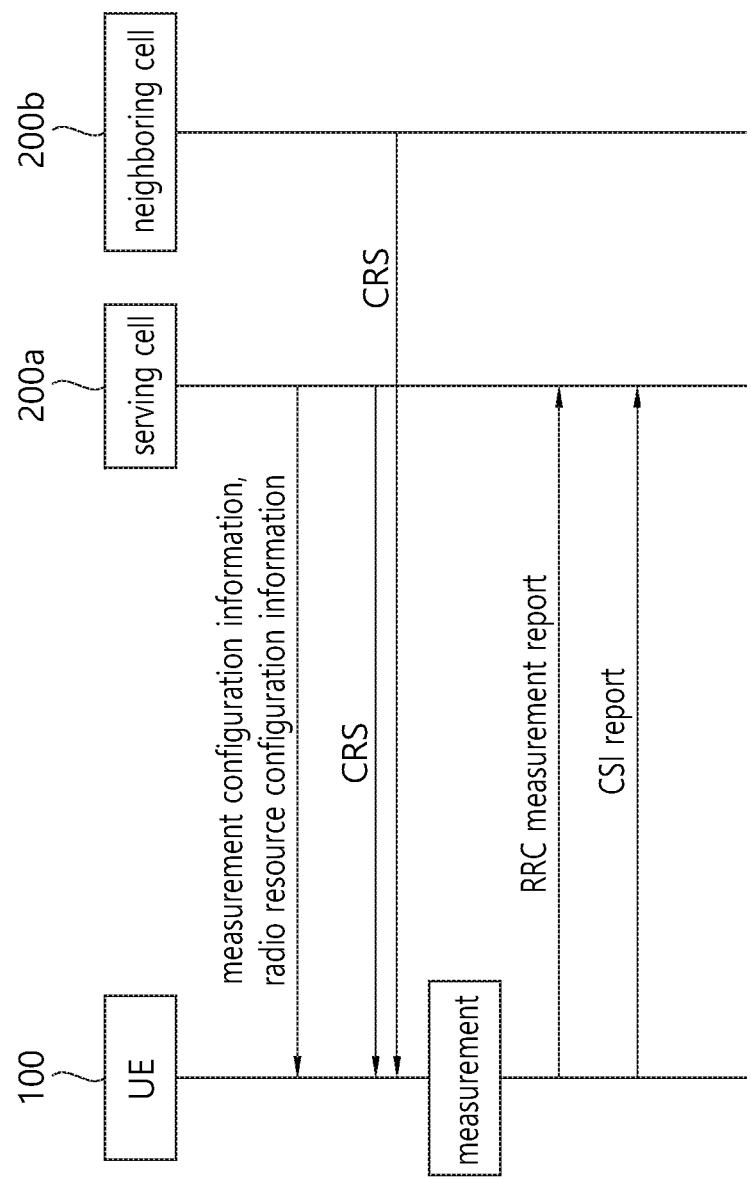
FIG. 6 illustrates a measurement and a measurement report procedure.

FIG. 6 illustrates a measurement and a measurement report procedure.

As may be seen with reference to FIG. 6, when a serving cell 200a and a neighbor cell 200b transmits a respective CRS (Cell-specific Reference Signal) to the UE 100, the UE 100 performs measurement through the CRS and transmits an RRC measurement report message, including a measurement result, to the serving cell 200a.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): This indicates reception power measured in the entire band. The RSSI includes all of a signal, interference, and thermal noise.

3) RSRQ (reference symbol received quality): This indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

The RSRQ may be calculated as an RSSI/RSSP.

Meanwhile, the UE 100 receives a measurement configuration (hereinafter also called "measconfing") information element (IE) from the serving cell 100 a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement result is called as a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell, and the inter-frequency measurement target may indicate a neighbor cell having a frequency band different from that of a serving cell, and the inter-RAT measurement target may indicate a neighbor cell having an RAT different from the RAT of a serving cell.

Specifically, the measurement configuration IE (Information Element) includes an IE, such as the following Table.

TABLE 3

MeasConfig ::=
-- Measurement objects
   measObjectToRemoveList
   measObjectToAddModList
-- Other parameters
   measGapConfig The Measurement objects IE includes measObjectToRemoveList indicative of a list of measObject to be removed and measObjectToAddModList indicative of a list that may be newly added or modified.

Meanwhile, the measGapConfig is used to configure or release the measurement gap (MG).

The measurement gap (MG) is a duration to perform a cell identification or a RSRP measurement on an inter frequency different from a frequency of the serving cell.

Meanwhile, the UE 100 receives a radio resource configuration (RRC) information element (IE) as shown. The radio resource configuration (RRC) dedicated information element (IE) is used to configure/modify/release a radio bearer, or modify a MAC configuration etc.

The radio resource configuration IE includes subframe pattern information. The subframe pattern information is information on a measurement resource restriction pattern in a time domain to measure the RSRP, and the RSRQ for the serving cell (e.g. a primary cell).

<Device to Device (D2D) Communication>

D2D communication which is expected to be introduced into a next-generation communication system is described below.

Figure 7:
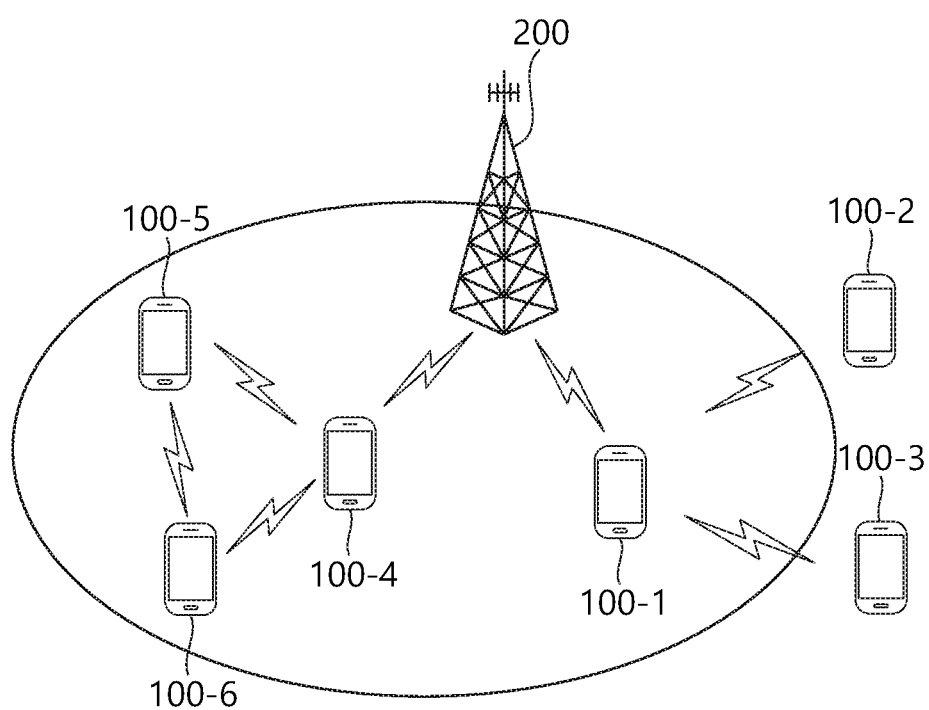
FIG. 7 shows an example of D2D communication.

FIG. 7 shows an example of D2D communication.

There is a need for communication between pieces of UE located at a physically close distance, that is, device to device (D2D) communication, due to an increase of user needs for social network service (SNS).

Figure 8:
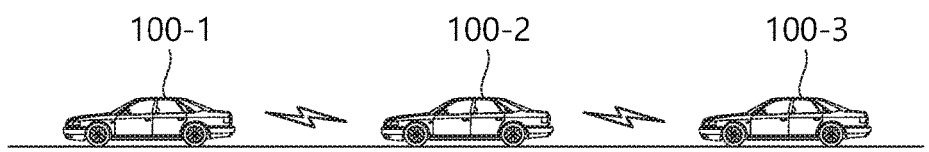
FIG. 8 is an exemplary diagram showing the concept of V2X.

In order to reflect the aforementioned needs, as shown in FIG. 8, a scheme for direct communication between UE#1 100-1, UE#2 100-2, and UE#3 100-3 or between UE#4 100-4, UE#5 100-5, and UE#6 100-6 without the intervention of an eNodeB (eNB) 200 is being discussed. The UE#1 100-1 and the UE#4 100-4 may directly communicate with each other with the help of the base station 200. The UE#4 100-4 may play the role of a relay node for the UE#5 100-5 and the UE#6 100-6. Likewise, the UE#1 100-1 may play the role of a relay node for the UE#2 100-2 and the UE#3 100-3 which are located far from the center of a cell.

D2D communication is also called a proximity service (ProSe). Furthermore, UE that performs a ProSe is also called ProSe UE. Furthermore, a link between pieces of UE used for the D2D communication is also called a sidelink. A frequency band which may be used in the sidelink is as follows.

TABLE 3

| Sidelink band | E-UTRA band | Transmission $F_{UL\_Low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used in the sidelink are as follows.
A physical sidelink shared channel (PSSCH)
A physical sidelink control channel (PSCCH)
A physical sidelink discovery channel (PSDCH)
A physical sidelink broadcast channel (PSBCH)
Furthermore, physical signals used in the sidelink are as follows.
A demodulation reference signal (DMRS)
A sidelink sync signal (SLSS)
The SLSS includes a primary sidelink sync signal (PSLSS) and a secondary sidelink sync signal (SSLSS).

<Vehicle-to Everything (V2X)>

The contents regarding D2D may also be applied to vehicle-to-everything (V2X).

The frequency bands that can be used for the V2X side link are as follows.

TABLE 7

| Sidelink Band | E-UTRA Band | Transmission FUL_low-FUL_high | Reception FDL_low-FDL_high | Duplex Mode |
|---|---|---|---|---|
| 47 | 47 | 5855 MHz 5925 MHz | 5855 MHz 5925 MHz | TDD |
| 3 | 3 | 1710 MHz-1785 MHz | 1805 MHz-1880 MHz | FDD |
| 7 | 7 | 2500 MHz-2570 MHz | 2620 MHz-2690 MHz | FDD |
| 8 | 8 | 880 MHz-915 MHz | 925 MHz-960 MHz | FDD |
| 39 | 39 | 1880 MHz-1920 MHz | 1880 MHz-1920 MHz | TDD |
| 41 | 41 | 2496 MHz 2690 MHz | 2496 MHz 2690 MHz | TDD |

V2X collectively refers to a communication technology through a vehicle and all of interfaces. An implementation form of V2X may be as follows.

FIG. 8 is an Exemplary Diagram Showing the Concept of V2X.

As may be seen with reference to FIG. 8, vehicles (i.e., radio devices 100-1, 100-2, and 100-3 mounted on the vehicles) may perform mutual communication. Herein, in V2X, "X" may be a vehicle. In this case, V2X may be indicated as vehicle-to-vehicle (V2V) and may mean communication between vehicles.

In V2X, "X" may mean a person or a pedestrian. In this case, V2X may be indicated as a vehicle-to-person or vehicle-to-pedestrian (V2P). In this case, the pedestrian is not necessarily limited to a person who walks, but may include a person who rides a bicycle and a driver or passenger on a (specific speed or less) vehicle.

Alternatively, "X" may mean an infrastructure/network. In this case, V2X may be indicated as vehicle-to-infrastructure (V2I) or a vehicle-to-network (V2N), and may mean communication between a vehicle and a roadside unit (RSU) or between a vehicle and a network. The RSU may be traffic-related infrastructure, for example, a device that provides notification of speed. The RSU may be implemented in a base station or fixed UE.

Meanwhile, in 3GPP, a sidelink which implies communication between UEs has recently also applied to eD2D and V2V ever since it was first introduced for D2D. However, unlike in the D2D, since the UE moves with high speed in the V2V, there is a need for a reference which is different from the D2D to specify communication between V2V UEs.

Figure 9:
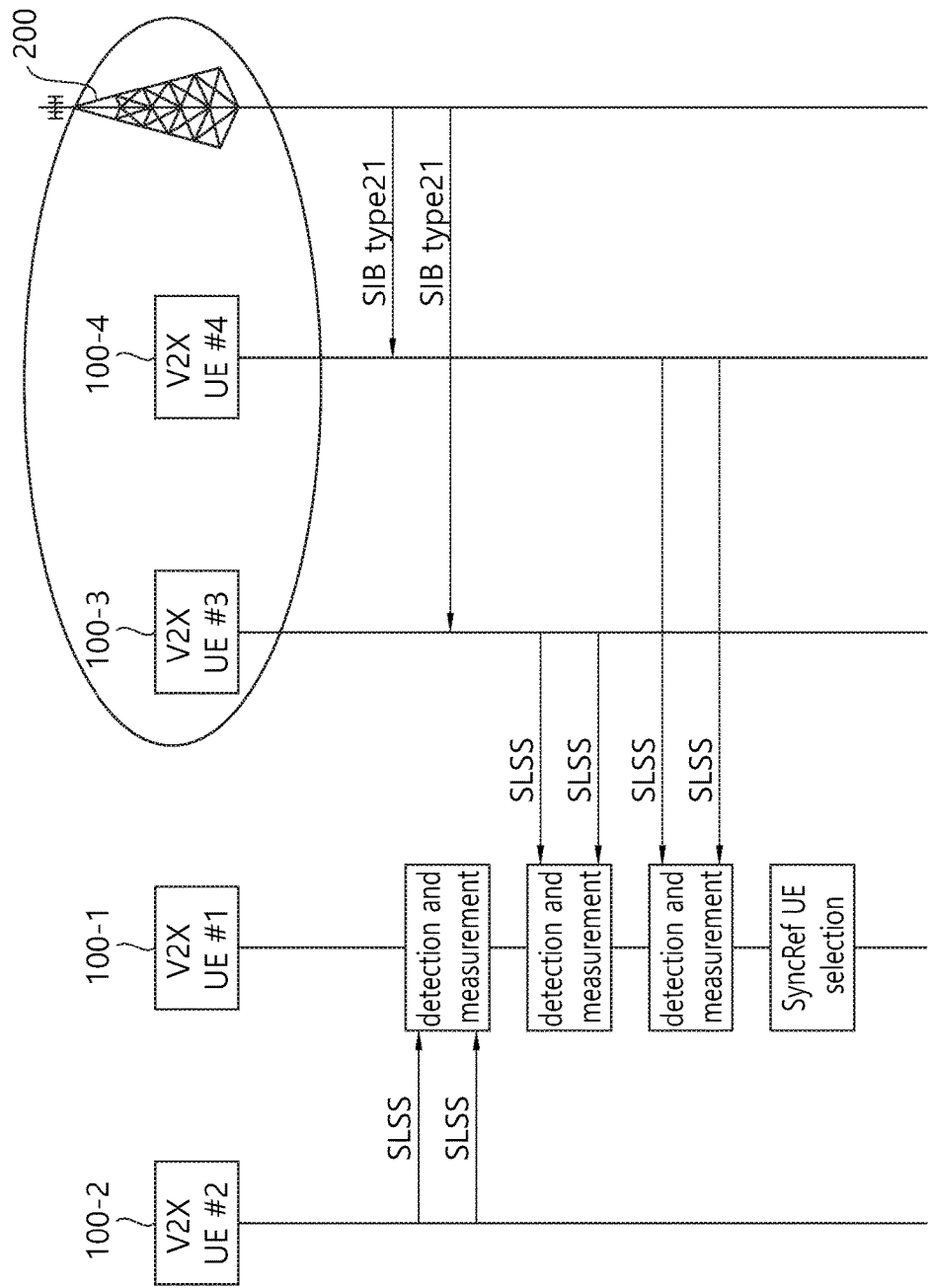
FIG. 9 illustrates a process of selecting a synchronization reference user equipment (UE) by a V2V UE#1 100-1 on the basis of a sidelink synchronization signal (SLSS) from a neighboring UE.

FIG. 9 illustrates a process of selecting a synchronization reference UE by a V2V UE#1 100-1 on the basis of a sidelink synchronization signal (SLSS) from a neighboring UE.

Referring to FIG. 9, a V2V UE#1 100-1 and a V2V UE#2 100-2 are located out of coverage of a BS, and a V2V UE#3 100-3 and a V2V UE#4 100-4 are located in coverage of the BS.

The V2V UE#3 100-3 and V2V UE#4 100-4 located in coverage receive an SIB-type 21 from the BS.

Upon receiving the SIB-type 21, the V2V UE#3 100-3 and the V2V UE#4 100-4 transmit an SLSS.

Upon receiving the SIB-type 21, the V2V UE#3 100-3 and the V2V UE#4 100-4 transmit the SLSS.

Meanwhile, the V2V UE#2 100-2 transmits the SLSS according to a predetermined parameter since it is located out of coverage of the BS and thus cannot receive the SIB-type 21.

The V2V UE#1 100-1 detects and measures the SLSS from neighboring UEs for sidelink communication. In addition, the V2V UE#1 100-1 selects a synchronization reference UE (also referred to as a SyncRef UE). The SyncRef UE implies a UE capable of transmitting a synchronization signal to the V2V UE.

For the detection and measurement, the UE#1 100-1 may use a predetermined parameter.

Meanwhile, the V2V UE#1 100-1 calculates an S-RSRP for an SLSS received from each UE to select the SyncRef UE. If an in-coverage UE S S-RSRP exceeds a minimum value indicated in syncRefMinHyst, a UE located in coverage is selected even if an out-of-coverage UE S-RSRP is great. If the in-coverage UE S-RSRP does not exceed the minimum value indicated in syncRefMinHyst and if the highest S-RSRP of the UE located out of coverage exceeds the minimum value indicated in syncRefMinHyst, a UE which has transmitted the highest S-RSRP is selected as a candidate of the SyncRef UE.

If the UE selected as the candidate further satisfies another condition, the V2V UE#1 100-1 finally selects the UE, which is selected as the candidate, as the SyncRef UE.

Meanwhile, the UE#1 100-1 determines whether an SLSS having a higher S-RSRP is received. If the SLSS having the higher S-RSRP is received, the UE#1 100-1 determines whether the higher S-RSRP is greater than the S-RSRP of the selected SyncRef UE by a value indicated in syncRefDiffHyst. If it is greater than that, a UE which has transmitted the SLSS having the higher S-RSRP is reselected as the SyncRef UE.

Meanwhile, the UE transmits the SLSS with a period of 40 ms (i.e., 4 frames or 40 subframes) in D2D communication, whereas the UE transmits the SLSS with a period of 160 ms (i.e., 16 frames or 160 subframes) in V2V communication. In addition, since the UE moves with high speed, a method of transmitting the SLSS and detecting the SLSS from neighboring UEs needs to be determined suitably for V2V communication.

<Disclosure of the Present Specification>

Accordingly, an object of the disclosure of the present specification is to provide an SLSS transmission period and SLSS detection method for a V2V UE which moves with high speed in order to solve the aforementioned problem.

TABLE 8

| Carrier Frequency 5.9 GHz | | | | | | | | | | | | |
|---|---|---|---|---|---|---|---|---|---|---|---|
| Frequency Offset | | | | | | | | | | | | |
| | [0 0 0]ppm | | | | | | [0 0.2 0.4]ppm | | | | | |
| SINR [dB] | −8 | −7 | −6 | −5 | −4 | −3 | −8 | −7 | −6 | −5 | −4 | −3 |
| AWGN | 1 | 1 | 1 | 1 | 1 | 1 | 1 | 1 | 1 | 1 | 1 | 1 |
| ETU500 | 4 | 3 | 2 | 2 | 2 | 2 | 4 | 3 | 3 | 2 | 2 | 2 |
| EVA2700 | 3 | 3 | 3 | 2 | 2 | 2 | 4 | 3 | 3 | 2 | 2 | 2 |

Table 8 above shows the number of times of detecting the SLSS so that a probability of detecting a SyncRef UE is greater than or equal to 90% in a band of 5.9 GHz.

Referring to Table 8 above, if an SINR is greater than or equal to −4 [dB], it can be seen that the probability of detecting the SyncRef UE is greater than or equal to 90% when the number of times of detecting the SLSS is less than or equal to 2 with respect to additive white Gaussian noise (AWGN), ETU500, and EVA2700. That is, if the SINR is greater than or equal to −4 [dB], the UE may detect the SyncRef UE with a probability greater than or equal to 90% even if an SLSS of a neighboring UE is received only 2 times.

In addition, in order to determine an SLSS transmission dropping rate for detecting the SyncRef UE, a transmission period of the SLSS, a transmission period of a PSCCH/PSSCH, and an RAN1 agreement may be taken into consideration. To detect the SyncRef UE, the present specification proposes that the transmission period of the SLSS is 160 ms and the transmission period of the PSCCH/PSCCH is 100 ms.

Therefore, a least common multiple of the SLSS transmission period and the PSCCH/PSSCH transmission period may be 800 ms. During 800 ms, the V2V UE may have 787 times of detection opportunity without dropping its transmission. The value 787 is a result of 800−13, and is a sum of the number of times (8 times) of transmitting the PSCCH/PSSCH and the number of times (5 times) of transmitting the SLSS. For example, according to the specification of RANI, the SLSS and the PSCCH/PSSCH may be transmitted in a subframe described below.

SLSS transmission subframe: 0, 160, 320, 480, 640 (ms) (during 800 ms)

PSCCH/PSSCH transmission subframe: 1, 101, 202, 302, 403, 504, 604, 705 (ms) (during 800 ms)

In addition, according to the RANI agreement, most of UEs transmit a GNSS-based SLSS at out-of-coverage (OoC). The UE may transmit an eNB-based SLSS with a second priority at the OoC, a SyncRef UE-based SLSS may be transmitted with a lowest priority.

Accordingly, it is reasonable to consider the GNSS-based SLSS and the eNB-based SLSS basically in V2X transmission bit dropping for detecting the SLSS. At the OoC, GNSS-based timing synchronization may be common between different UEs, and eNB-based timing synchronization may not be identical between the different UEs. This is because each eNB may be an asynchronous network. In V2X communication, the asynchronous network may be not much used for a distance in which communication of the UE is possible. Accordingly, the total number of detectable different timing synchronizations may be small in a time domain.

The following scenarios may be assumed to detect the SLSS at the OoC on the basis of the small number of synchronizations in the time domain.

If the UE selects a GNSS on the basis of timing and cannot detect the GNSS at the OoC, A1) the UE may attempt to detect the SLSS in a subframe scheduled to transmit the GNSS-based SLSS when the GNSS is being detected, or B1) the UE may attempt to detect the SLSS in a subframe scheduled to transmit the PSCCH/PSSCH, or C1) the UE may attempt to detect the SLSS in a subframe in which the PSCCH/PSSCH is received.

In addition, if the UE selects a SyncRef UE on the basis of timing at the OoC,

A2) the UE may attempt to detect the SLSS in a subframe scheduled to transmit the SLSS of the UE, or B2) the UE may attempt to detect the SLSS in a subframe scheduled to transmit the PSCCH/PSSCH, or C2) the UE may attempt to detect the SLSS in a subframe in which the PSCCH/PSSCH is received.

Herein, A1), B1), A2), and B2) are related with a dropping rate. In addition, a probability that transmission of the UE overlaps with transmission of other SLSSs may be considered in the SLSS dropping.

The overlapping probability is:
closed to 1 in A1) and A2); and
very low, i.e., 12.5%, in B1) and B2).

That is, in B1) and B2), among 8 subframes, one subframe overlaps, and 7 subframes do not overlap. Accordingly, there is no need to consider the V2X dropping rate.

The present specification proposes the followings on the basis of the overlapping probability.

Proposal 1: The V2X drop rate for SLSS monitoring is specified only in a subframe scheduled such that the UE transmits the SLSS at the OoC.

Proposal 2: The V2X drop rate for SLSS monitoring is not necessarily specified only in a subframe scheduled such that the UE transmits the PSCCH/PSSCH at the OoC.

In addition, regarding Table 8 above (i.e., regarding a least common multiple of 800 ms and a overlap probability between SLSS transmission of the UE and SLSS transmission of another UE), the present specification proposes the followings.

Proposal 3: In case of V2X, a detection time of the SyncRef UE may be specified as 800 ms in SCH Es/Iot≥−4 dB, and the V2X UE may drop by up to 40% of an SLSS transmitted in a physical layer to select/reselect the SyncRef UE.

In addition, the detection time may be 1600 ms which is two times the least common multiple (800 ms) of an SLSS period (160 ms) and a PSCCH/PSCCH period (100 ms). However, the detection time is not preferably greater than or equal to 2 sec.

In the detection time (800 ms), the SLSS may be transmitted 5 times. As a simulation result of Table 8 above, if there is an attempt for detecting an SLSS of a different UE two times, it can be detected with a probability of at least 90%. Therefore, the UE may attempt to detect an SLSS transmitted by the different UE while dropping two times of transmission out of the total number of times (i.e., 5 times) of SLSS transmission. In this case, the SLSS transmission drop rate of the UE may be up to 40%.

According to an embodiment of the present invention, if the UE is synchronized based on the GNSS but misses GNSS synchronization, the UE may detect an SLSS transmitted by a different UE in up to 40% of a subframe scheduled for its SLSS transmission. In addition, according to another embodiment of the present invention, if the UE is synchronized based on the different UE at the OoC, the UE may discard up to 40% of SLSS transmission, and may receive an SLSS transmitted by the different UE in a subframe corresponding to the discarded SLSS.

The aforementioned proposals are summarized as shown in the following figure.

Figure 10A:
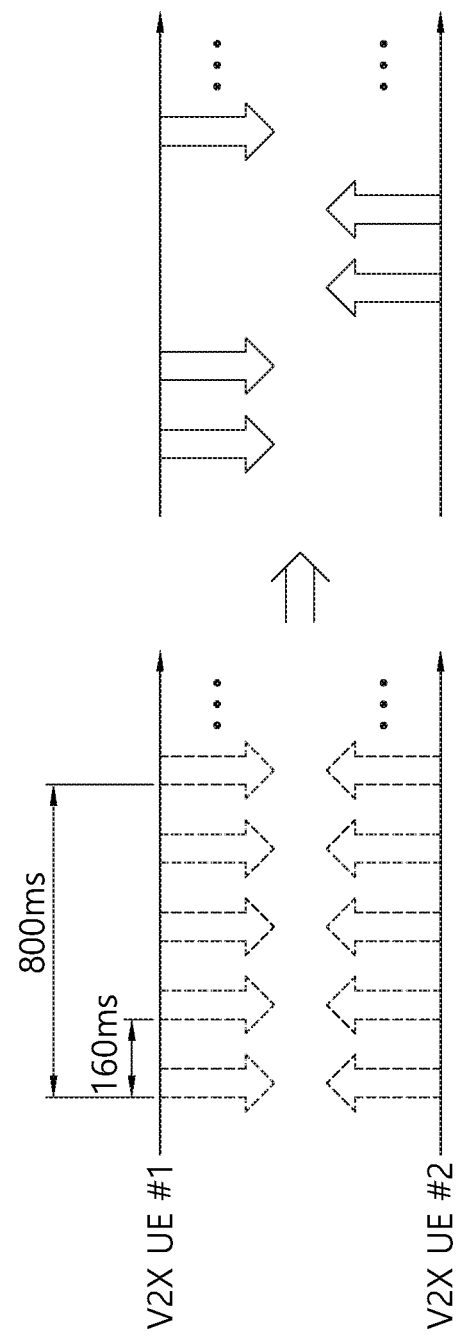

FIG. 10a and FIG. 10b illustrate an SLSS transmission period of a V2V UE and a method of detecting a synchronization reference signal by the V2V UE according to a disclosure of the present specification.

Referring to FIG. 10a and FIG. 10b, a V2V UE#1 100-1 may transmit an SLSS with a period of 160 ms. In this case, the V2V UE#1 100-1 may transmit a PSCCH/PSCCH with a period of 100 ms.

Referring to the left side of FIG. 10a, the V2V UE#1 100-1 may determine to transmit the SLSS 5 times during 800 ms which is a least common multiple of a transmission period of the SLSS and a transmission period of the PSCCH/PSSCH.

In this case, if the V2V UE#1 100-1 is synchronized based on GNSS at OoC but misses the GNSS or if the V2V UE#1 100-1 is synchronized based on a different UE, an SLSS must be received from the different UE to find a SyncRef UE. However, the V2V UE#1 100-1 cannot simultaneously transmit and receive the SLSS since the same frequency is used in transmission and reception, and the V2V UE#1 100-1 cannot transmit its SLSS when receiving an SLSS of the different UE.

Accordingly, referring to the right side of FIG. 10a, to find the SyncRef UE, the V2V UE#1 100-1 may discard 2 times of SLSS transmission out of 5 times of SLSS transmission on the basis of the determined period and number of times of transmission. That is, among SLSSs determined to be transmitted, 40% of SLSS transmission may be discarded. The number of times of discarding is a value depending on the simulation result of Table 8 above. Therefore, the V2V UE#1 100-1 must receive the SLSS transmitted by the different UE instead of transmitting the SLSS during a subframe corresponding to 2 times of transmission out of 5 times of SLSS transmission. In case of FIG. 10a, the V2V UE#1 100-1 receives an SLSS transmitted by a neighboring V2V UE#2 100-2, thereby detecting the SLSS transmitted by the V2V UE#1 100-2 with a probability of at least 90%.

Referring to the left side of FIG. 10b, the V2V UE#1 100-1 may determine to transmit the SLSS 10 times during 1600 ms which is double the least common multiple of a transmission period of the SLSS and a transmission period of the PSCCH/PSSCH.

In this case, if the V2V UE#1 100-1 is synchronized based on GNSS at OoC but misses the GNSS or if the V2V UE#1 100-1 is synchronized based on a different UE, an SLSS must be received from the different UE to find a SyncRef UE. However, the V2V UE#1 100-1 cannot simultaneously transmit and receive the SLSS since the same frequency is used in transmission and reception, and the V2V UE#1 100-1 cannot transmit its SLSS when receiving an SLSS of the different UE.

Accordingly, referring to the right side of FIG. 10b, to find the SyncRef UE, the V2V UE#1 100-1 may discard 2 times of SLSS transmission out of 10 times of SLSS transmission on the basis of the determined period and number of times of transmission. That is, among SLSSs determined to be transmitted, 20% of SLSS transmission may be discarded. The number of times of discarding is a value depending on the simulation result of Table 8 above. Therefore, the V2V UE#1 100-1 must receive the SLSS transmitted by the different UE instead of transmitting the SLSS during a subframe corresponding to 2 times of transmission out of 10 times of SLSS transmission. In case of FIG. 10b, the V2V UE#1 100-1 receives an SLSS transmitted by a neighboring V2V UE#2 100-2, thereby detecting the SLSS transmitted by the V2V UE#1 100-2 with a probability of at least 90%.

The above mentioned embodiments of the present invention may be implemented by hardware.

Figure 11:
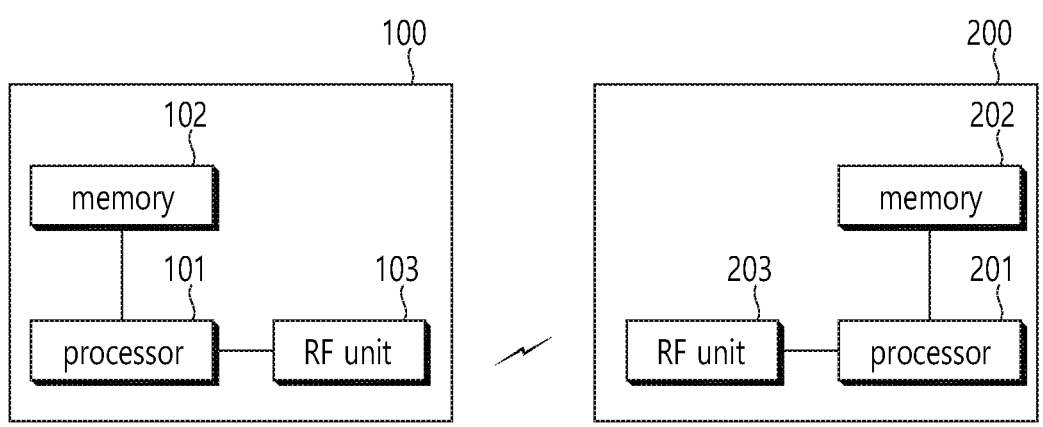
FIG. 11 is a block diagram illustrating a wireless communications system in which the disclosure of the present specification is implemented.

FIG. 11 is a block diagram illustrating a wireless communications system in which the disclosure of the present specification is implemented.

A BS 200 includes a processor 201, a memory 202 and an RF (radio frequency) unit 203. The memory 202 is connected to the processor 201, and stores various information for driving the processor 201. The RF unit 203 is connected to the processor 201, and transmits and/or receives radio signals. The processor 201 implements proposed functions, processes and/or methods. In the above mentioned embodiment, the operation of the BS 50 can be implemented by the processor 201.

A UE 100 includes a processor 101, a memory 102 and an RF unit 103. The memory 102 is connected to the processor 61, and stores various information for driving the processor 101. The RF unit 103 is connected to the processor 101, and transmits and/or receives radio signals. The processor 101 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of detecting a sidelink synchronization signal (SLSS) of a neighboring terminal by a terminal, the method comprising:
   transmitting first SLSSs during a first time duration,
   wherein the terminal detects second SLSSs transmitted by the neighboring terminal within the first time duration,
   wherein the terminal drops transmission of SLSSs among the first SLSSs to be transmitted during the first time duration according to a preset SLSS drop rate,
   wherein the terminal does not drop data signals even though the transmission of SLSSs are allowed to be dropped, and
   wherein the preset SLSS drop rate is up to 30%.

2. The method of claim 1, wherein the terminal drops transmission of two SLSSs among the first SLSSs to be transmitted during the first time duration.

3. The method of claim 1, wherein the first time duration is a least common multiple of a SLSS transmission period and a transmission period of a physical sidelink control channel (PSCCH).

4. The method of claim 3,
   wherein the transmission period of the SLSS is 160 ms, and the transmission period of the PSCCH is 100 ms, and
   wherein the first time duration is 800 ms.

5. The method of claim 1, wherein the first time duration is two times a least common multiple of a SLSS transmission period and a transmission period of a physical sidelink control channel (PSCCH).

6. The method of claim 5,
   wherein the SLSS transmission period is 160 ms, and the transmission period of the PSCCH is 100 ms, and
   wherein the first time duration is 1600 ms.

7. A terminal for detecting a sidelink synchronization signal (SLSS) of a neighboring terminal, the terminal comprising:
   a radio frequency (RF) unit including a transmitter configured to transmit first SLSSs; and
   a processor configured to control the RF unit,
   wherein the processor,
      controls the RF unit to transmit the first SLSSs during a first time duration;
      detects second SLSSs transmitted by the neighboring terminal within the first time duration;
      drops transmission of SLSSs among the first SLSSs to be transmitted during the first time duration according to a preset SLSS drop rate, and
      does not drop data signals even though the transmission of SLSSs are allowed to be dropped, and
   wherein the preset SLSS drop rate is up to 30% of the first time duration.

8. The terminal of claim 7, wherein the terminal drops transmission of two SLSSs among the first SLSSs to be transmitted during the first time duration.

9. The terminal of claim 7, wherein the first time duration is a least common multiple of a SLSS transmission period and a transmission period of a physical sidelink control channel (PSCCH).

\* \* \* \* \*